US006424416B1

(12) United States Patent
Gross et al.

(10) Patent No.: US 6,424,416 B1
(45) Date of Patent: Jul. 23, 2002

(54) INTEGRATED OPTICS PROBE FOR SPECTRAL ANALYSIS

(75) Inventors: Erich R. Gross, Rohnert Park; Anthony S. Lee, Petaluma, both of CA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 09/426,826

(22) Filed: Oct. 25, 1999

(51) Int. Cl.[7] .............................. G01J 3/02; G01J 3/42
(52) U.S. Cl. .................. 356/326; 356/328; 356/419
(58) Field of Search ............................... 356/326, 328, 356/419

(56) References Cited

U.S. PATENT DOCUMENTS

| | | | |
|---|---|---|---|
| 3,281,597 A | 10/1966 | Greenberg | 250/43.5 |
| 3,773,424 A | 11/1973 | Selgin | 356/181 |
| 4,003,660 A | 1/1977 | Christie, Jr. et al. | 250/226 |
| 4,260,262 A | 4/1981 | Webster | 356/418 |
| 4,260,263 A | 4/1981 | Kummer | 356/448 |

(List continued on next page.)

FOREIGN PATENT DOCUMENTS

| | | |
|---|---|---|
| DE | 2938-844 | 9/1979 |
| DE | 3401475 A1 | 7/1985 |
| EP | 0 491 131 A1 | 6/1992 |
| EP | 0 806 653 | 11/1997 |
| JP | 06138043 | 5/1994 |

(List continued on next page.)

OTHER PUBLICATIONS

Wetzel, D., "Near–Infrared Reflectance Analysis, Sleeper Among Spectroscopic Techniques," *Analytical Chemistry,* 55(12):1165A–1176A (Oct. 1983).

Goddu, R.F., and Delker, D.A., "Spectra–Structure Correlations for the Near–Infrared Region," Aids for the Analyst. In *Analytical Chemistry,* 32(1):140–141 (Jan. 1960).

Mosen, A.W., and Buzzelli, G., "Determination of Impurities in Helium by Gas Chromatography," Aids for the Analyst. In *Analytical Chemistry,* 32(1):141–142 (Jan. 1960).

Starr, C., et al., "Applications of Near Infrared Reflectance Analysis in Breeding Wheats for Bread–making Quality," Near Infrared Analysis—Today or Tomorrow? In *Anal. Proc.,* 20:72–74 (Feb. 1983).

Winch, J.E., and Major, H., "Predicting Nitrogen and Digestibility of Forages Using Near Infrared Reflectance Photometry," *Canadian Journal of Plant Science* 61:45–51 (Jan. 1981).

Osborne, B.G., and Fearn, T., "Discriminant Analysis of Black Tea by Near Infrared Reflectance Spectroscopy," In *Food Chemistry,* eds. (England: Elsevier Applied Science Publishers Ltd.) 29(1):233–238 (1988).

Kisner, H.J, et al., "Multiple Analytical Frequencies and Standards for the Least–Squares Spectrometric Analysis of Serum Lipids," *Analytical Chemistry,* 55(11):1703–1707 (Sep. 1983).

Ciurczak, E.W., "Uses of Near–Infrared Spectroscopy in Pharmaceutical Analysis," *Applied Spectroscopy Reviews,* 23(1&2):147–163 (1987).

Geladi, P., et al., "Linearization and Scatter–Correction for Near–Infrared Reflectance Spectra of Meat," *Applied Spectroscopy,* 39(3):491–500 (1985).

(List continued on next page.)

Primary Examiner—F. L. Evans
(74) Attorney, Agent, or Firm—Foley, Hoag & Eliot LLP

(57) ABSTRACT

Percentage concentrations of constituents or color components of a sample are determined using a spectral analyzer with a wide illumination spot size and detector. The analyzer irradiates the sample, picks up diffuse reflectance of individual wavelengths from the sample and spatially separates the diffuse reflectance into a response at individual wavelengths. The result is to simultaneously detect the intensities of the individual wavelengths in parallel from the sample being analyzed. Percentage constituents of a composite substance can be determined or, alternatively, the components of color in a sample can be determined by analyzing wavelengths of reflected light.

47 Claims, 2 Drawing Sheets

U.S. PATENT DOCUMENTS

| | | | |
|---|---|---|---|
| 4,266,878 A | 5/1981 | Auer | 356/419 |
| 4,286,327 A | 8/1981 | Rosenthal et al. | 364/498 |
| 4,403,191 A | 9/1983 | Satake | 324/452 |
| 4,441,979 A | 4/1984 | Dailey | 204/402 |
| 4,540,286 A | 9/1985 | Satake et al. | 356/445 |
| 4,627,008 A | 12/1986 | Rosenthal | 364/550 |
| 4,658,147 A * | 4/1987 | Eldering | 356/328 |
| 4,692,620 A | 9/1987 | Rosenthal | 250/343 |
| 4,729,247 A | 3/1988 | Brown | 73/866.4 |
| 4,752,689 A | 6/1988 | Satake | 250/339 |
| 4,806,764 A | 2/1989 | Satake | 250/339 |
| 4,968,143 A * | 11/1990 | Weston | 356/328 |
| 4,997,280 A | 3/1991 | Norris | 356/308 |
| 5,021,662 A | 6/1991 | Johnson | 250/339 |
| 5,092,819 A | 3/1992 | Schroeder et al. | 460/7 |
| 5,106,339 A | 4/1992 | Braun et al. | 460/7 |
| 5,128,882 A | 7/1992 | Cooper et al. | 364/550 |
| 5,148,288 A | 9/1992 | Hannah | 358/298 |
| 5,155,628 A | 10/1992 | Dosmann | 359/640 |
| 5,159,199 A | 10/1992 | LaBaw | 250/339 |
| 5,166,755 A | 11/1992 | Gat | 356/419 |
| 5,179,025 A | 1/1993 | Koontz et al. | 436/52 |
| 5,205,293 A | 4/1993 | Ito et al. | 128/691 |
| 5,206,699 A | 4/1993 | Stewart et al. | 356/30 |
| 5,218,207 A | 6/1993 | Rosenthal | 250/341 |
| 5,241,178 A | 8/1993 | Shields | 250/339 |
| 5,258,825 A | 11/1993 | Reed et al. | 356/402 |
| 5,260,584 A | 11/1993 | Popson et al. | 250/571 |
| 5,272,518 A | 12/1993 | Vincent | 356/405 |
| 5,319,200 A | 6/1994 | Rosenthal et al. | 250/341 |
| 5,327,708 A | 7/1994 | Gerrish | 56/1 |
| 5,351,117 A | 9/1994 | Stewart et al. | 356/30 |
| 5,377,000 A | 12/1994 | Berends | 356/73 |
| 5,383,452 A | 1/1995 | Buchert | 128/633 |
| 5,406,084 A | 4/1995 | Tobler et al. | 250/339.01 |
| 5,433,197 A | 7/1995 | Stark | 128/633 |
| 5,459,313 A | 10/1995 | Schrader et al. | 250/223 |
| 5,460,177 A | 10/1995 | Purdy et al. | 128/633 |
| 5,461,229 A | 10/1995 | Sauter et al. | 250/253 |
| 5,464,981 A | 11/1995 | Squyres et al. | 250/341.8 |
| 5,475,201 A | 12/1995 | Pike | 219/497 |
| 5,476,108 A | 12/1995 | Dominguez et al. | 131/108 |
| 5,480,354 A | 1/1996 | Sadjadi | 460/7 |
| 5,489,980 A | 2/1996 | Anthony | 356/308 |
| 5,502,799 A | 3/1996 | Tsuji et al. | 395/131 |
| 5,503,006 A | 4/1996 | Babaian-Kibala et al. | 73/86 |
| 5,510,619 A | 4/1996 | Zachmann et al. | 250/339.08 |
| 5,548,115 A | 8/1996 | Ballard et al. | 250/253 |
| 5,616,851 A | 4/1997 | McMahon et al. | 73/29.01 |
| 5,625,459 A | 4/1997 | Driver | 356/446 |
| 5,642,498 A | 6/1997 | Kutner | 395/157 |
| 5,654,496 A | 8/1997 | Thompson | 73/1.01 |
| 5,676,143 A | 10/1997 | Simonsen et al. | 128/633 |
| 5,684,582 A | 11/1997 | Eastman et al. | 356/328 |
| 5,736,410 A | 4/1998 | Zarling et al. | 356/346 |
| 5,739,536 A | 4/1998 | Bucholtz et al. | 250/341.2 |
| 5,745,234 A | 4/1998 | Snail et al. | 356/236 |
| 5,751,421 A | 5/1998 | Wright et al. | 356/328 |
| 5,784,158 A | 7/1998 | Stanco et al. | 356/326 |
| 5,808,305 A | 9/1998 | Leidecker et al. | 250/341.8 |
| 5,813,987 A | 9/1998 | Modell et al. | 600/473 |
| 5,824,567 A | 10/1998 | Shih et al. | 438/73 |
| 5,847,825 A | 12/1998 | Alexander | 356/318 |
| 5,867,265 A | 2/1999 | Thomas | 356/328 |
| 5,880,826 A | 3/1999 | Jung et al. | 356/73 |
| 5,884,775 A | 3/1999 | Campbell | 209/581 |
| 5,953,119 A | 9/1999 | Zigler et al. | 356/326 |
| 5,957,773 A | 9/1999 | Olmsted et al. | 460/7 |
| 6,100,526 A | 8/2000 | Mayes | 250/339.11 |

FOREIGN PATENT DOCUMENTS

| | | | |
|---|---|---|---|
| JP | 11-83627 A | * | 3/1999 |
| WO | WO 96/08710 | | 3/1996 |
| WO | WO 98/11410 | | 3/1998 |
| WO | WO 99/40419 | | 8/1999 |

OTHER PUBLICATIONS

Nyden, M.R., et al., "Spectroscopic Quantitative Analysis of Strongly Interacting Systems: Human Plasma protein Mixtures," *Applied Spectroscopy* 42(4):588–594 (1988).

Watson, C.A., "Near Infrared Reflectance Spectrophotometric Analysis of Agricultural Products," Instrumentation, In *Analytical Chemistry*, 49(9):835A–840A (Aug. 1977).

Mats, J., et al., "Optical Fiber Spectrometry in Turbid Solutions by Multivariate Calibration Applied to Tablet Dissolution Testing," *Analytical Chemistry*, 60(24):2666–2671 (Dec. 15, 1988).

Honigs, D.E., et al., "Near–Infrared Reflectance Analysis by Gauss–Jordan Linear Algebra," *Applied Spectroscopy*, 37(6):Errata, 491–497 (1983).

Honigs, D.E., et al., "A New Method for Obtaining Individual Component Spectra from Those of Complex Mixtures," *Applied Spectroscopy*, 38(3):317–322 (1984).

Stark, E., and Luchter, K., "Near–Infrared Analysis (NIRA): A Technology for Quantitative and Qualitative Analysis," *Applied Spectroscopy Reviews*, 22(4):335–399 (1986).

Norris, K.H., et al., "Predicting Forage Quality by Infrared Reflectance Spectroscopy," *Journal of Animal Science*, 43(4):889–897 (1976).

Keefe, P.D., "A dedicated wheat grain image analyzer," *Plant Varieties and Seeds*, 5:27–33 (1992).

Suppliers of Kestrel™ brand systems for imaging spectroscopy. Rhea Corporation Home Page, http://home.navisoft.com/rheacorp/ (Sep. 22, 1997 6:57 AM).

Yamamoto, K.Y., et al., "Detection of Metals in the Environment Using a Portable Laser–Induced Breakdown Spectroscopy Instrument," Detection of Metals in the Environment Us . . . Induced Breakdown Spectroscopy Instrument, http://esther.la.asu.edu/sas/journal/ASv50n2/ASv50n2_sp12.html (Sep. 22, 1997 7:08 AM).

Baird, W., and Nogar, N.S., "Compact, Self–Contained Optical Spectrometer," Compact, Self–Contained Optical Spectrometer, http://esther.la.asu.edu/sas/journal/ASv49n11/ Asv49n11–sp20.html (Sep. 22, 1997 7:12 AM).

"Perstorp Analytical," Perstorp Analytical Products, http://www.i–way.net.uk/sinar/products/ (Sep. 22, 1997 7:31 AM).

"Grain Flow and Moisture Sensor Calibration," Department of Biosystems and Agricultural Engineering, http://www-.bae/umn/edu/annrpt/1995/research/mach1.html (Sep. 22, 1997 7:33 AM).

Lutton, C., "Cyberfarm," Computers/Communications, In *Forbes*, pp. 86–87 (Jul. 15, 1996).

"Infrared detectors," Near Infrared Spectroscopy in Food Analysis, In *Fundamentals of Near Infrared Instrumentation*, pp. 71–73 (undated).

"Better Crops with Plant Food," 81(4) (1997).

Schneider, I., et al., "Fiber–Optic Near–Infrared Reflectance Sensor for Detection of Organics in Soils," *IEEE Photonics Technology Letters*, 7(1):87–89 (Jan. 1995).

Derwent; Abstract of Publication No.: SU 514111A, ACC–No: 1977–A3525Y "Model Radial Axial Hydraulic Turbine Installation With Test Probe Holder at Lower Blade Ring" Assignee: Lengd Metal Wks [LEMD] (Jun. 22, 1996).

* cited by examiner

INTEGRATED OPTICS PROBE FOR SPECTRAL ANALYSIS

BACKGROUND OF THE INVENTION

Spectral analyzers have long gained favor because they provide a fast and non-destructive means of analyzing different types of samples. Based on this technology, it is possible not only to determine the characteristics of a sample surface, but sometimes the constituent components beneath a sample surface. Typically, an optimal range of wavelengths is selected to irradiate a sample, where reflected or transmitted light is measured to determine the characteristics of the sample. Some samples, for example, are best analyzed using a near infrared spectrum of light while others are optimally analyzed using a range such as visible or mid infrared spectrum.

Analyzers of the prior art typically use a filter wheel or scanning diffraction grating to serially generate the specific wavelengths that are of interest in analyzing a sample. Based on moving parts, filter wheels and scanning diffraction gratings are sensitive to vibration and are not reliable in analyzing a sample generally. They therefore are not suitable for withstanding the mechanical vibrations generated by machinery, and therefore have not found use in real-time measurements of samples other than in controlled laboratories.

Optical systems typically include fiber optic cables to conveniently transmit light from a source to a destination located at a distance. Unfortunately, fiber optic cables can not be used in certain applications, such as those that include machinery generating severe mechanical vibrations, without further conditioning of the optical signal because such mechanical vibrations can cause undesirable modal disturbances within the optical fiber. These modal disturbances create light intensity disturbances that are not related to the surface or internal properties of a sample. Therefore, without incorporating costly conditioning mechanisms, the quality of an optical signal can be degraded. This detracts from the accuracy of the spectral measuring device.

Most spectral analyzers utilize a narrow spot size to intensely irradiate a sample to be analyzed. This is largely due to the fact that most wavelength detectors for analyzing a sample depend on reflected light that is transmitted through a fiber optic cable. Illuminating a sample with a highly intense incident light typically results in a greater amount of reflected light that is more easily measured by a detection device, which is often limited in sensitivity. Unfortunately, a narrow spot size can sometimes provide inaccurate measurements because a small spot may not be representative of the whole sample.

Some spectral analyzers further include an illuminating source disposed in the same cavity as a detector that receives the reflected light from an irradiated sample. In such a case, stray light reflecting from within the chamber, rather than off the sample, is sometimes erroneously included in the measurement. This often has a devastating impact on measurement accuracy.

The overall design of a spectral analyzer, therefore, including its individual components is critical to provide the most accurate method of detecting subtle differences in an analyzed sample. The balance of this specification discusses the features of the inventive spectral analyzer and associated methods in detail.

SUMMARY OF THE INVENTION

This invention is a spectral analysis system and method for determining percentage concentration of constituents and color characteristics of a sample. It has a wide array of applications in areas that require spectral measurements of larger sample areas. Such applications include but are not limited to non-invasive blood analysis, surface moisture measurements, and calorimeter analysis of a samples such as wallpaper.

The invention uses the diffuse reflectance properties of light to obtain percentage concentrations of constituents in samples such as agricultural products or blood. Additionally, the invention uses the diffuse reflectance properties of light to determine color components of a sample area such as a section of wallpaper or paint on an automobile.

In the preferred embodiment, techniques of the present invention involve measuring a spectral response to various wavelengths from visible to infrared. Typically, a preferred range of wavelengths is determined for a particular application and a corresponding detection device and illuminating lamp are matched accordingly for the application. Visible wavelength light is ordinarily used in calorimeter applications, while infrared is preferably used in grain monitoring applications.

The analyzer of the present invention includes a light source having a suitably broad bandwidth for simultaneously irradiating a sample to be analyzed with multiple wavelengths of light. A detector receives the radiation diffusely reflected from the sample where the received optical signal is analyzed by a real-time computation subsystem to determine constituents or color components of the sample.

A light source is angularly positioned in a first chamber to irradiate the sample through a window formed of a suitable protective material such as sapphire or glass. Optionally, the light source is focused using a lens or parabolic mirror to intensify the light irradiating the sample. This enhances reception of reflected light off the sample into the detector, which is positioned in a second chamber. The design of each chamber ensures that stray light from the lamp is not received by the detector from within the detection apparatus itself during a sample measurement. Rather, light received by the detector positioned in second chamber, adjacent to the first chamber, is essentially only light reflected off the sample.

In the preferred embodiment, the windows are separated from each other on a common plane while associated chambers are adjacent to each other. However, the windows are optionally angular with respect to a common plane. Further, the light source and detector in the first and second chamber respectively are optionally positioned across from each other such that light transmits through the sample into the detector. In this embodiment, a spectral analysis is then performed on the transmissive properties of the sample instead of reflective properties.

The second chamber includes a diffuser in the path of the light received from the irradiated sample to ensure that only spectral information is measured without imaging of the sample. The diffused optical signal emanating from the diffuser is then fed into a wavelength separator, such as a linear variable filter (LVF), within the second chamber to spatially separate the wavelengths of interest.

The wavelength separator in turn feeds the optical signal into a suitable detection device, such as a multiplexed detection array, which is capable of simultaneously detecting the spatially separated wavelengths reflected from the irradiated sample. Electrical signals from the detection device corresponding to individual wavelengths of light from the irradiated sample are converted into digital data where they are spectrally analyzed by a computation device to calculate color components or the percentage concentration of various constituents of the sample.

The present invention also includes a reflective device in the first chamber to redirect a portion of the optical lamp light, which serves as an optical reference, into the detector located in the second chamber. A controllable shutter mechanism is used to block this reference light when a sample is spectrally analyzed. Conversely, another shutter mechanism blocks light reflected from the sample when the reference light is spectrally analyzed. Based on a combination of reference and sample measurements, a precise wavelength analysis is used to determine, for example, constituents in a sample such as blood or the average color of a section of wall paper for paint color matching.

The components comprising the present invention are preferably integrated into a single unit to create a portable handheld spectral analyzer capable of illuminating a sample with a large spot size, where reflected light is further detected using a wide angle viewing aperture. Such a device is beneficial in applications where a sample cannot be easily moved to the analyzer. For example, a piece of wallpaper adhered to the surface of a wall in a home can be analyzed by focusing the handheld portable analyzer on the desired area and measuring reflected wavelength properties.

The analyzer of the present invention advantageously monitors a sample without requiring an expensive and restrictive fiber optic cable. Modal disturbances caused by mechanical vibrations in the optical fibers are therefore avoided. Furthermore, the aperture of monitored light from the irradiated sample can be much larger because there is no need to incorporate an optical pickup to guide the sample light into a narrow fiber optic cable. The wide aperture optical return signal results in a larger analyzed sample area supporting more accurate sample measurements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
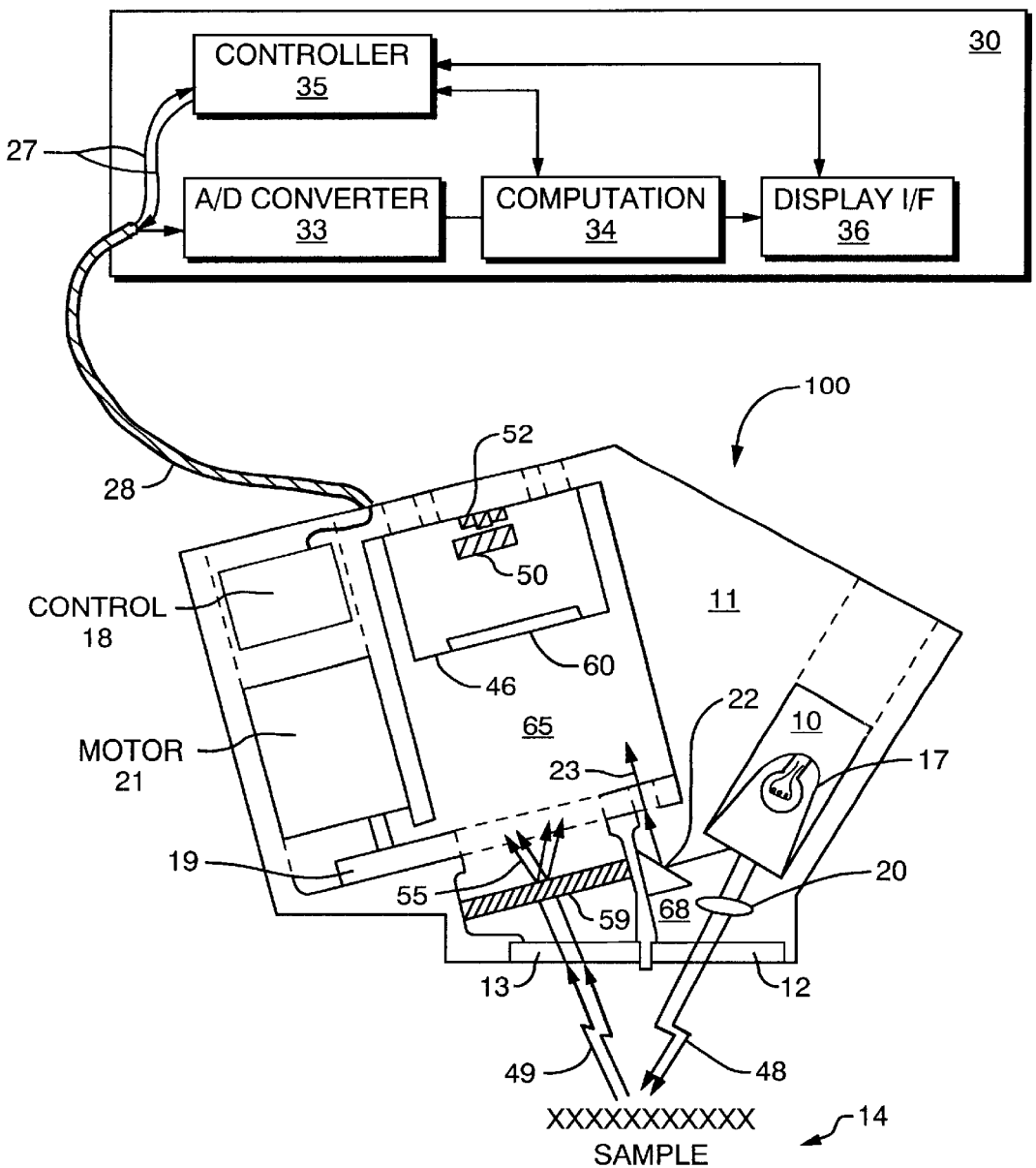
FIG. 1 is a high level schematic illustration of a spectral analyzer according to the present invention.

Referring now more particularly to FIG. 1, the present invention is a system 100 for analyzing the constituent or color components of a sample 14. The applications of the spectral analyzer device are rather unlimited as it can be used in any situation that requires or benefits from a large illumination spot size and wide angle viewing detector.

The system 100 uses a suitable continuous irradiating light source 10. Radiation from the light source 10 shines forward through a first window 12 to the surface of a sample 14.

The light source 10 continuously and simultaneously produces light of multiple wavelengths in a region of interest. Depending on the application, the present invention supports wavelength analysis in a range between visible and mid-infrared corresponding to 400 to 5000 nanometers. The actual range of light used in a particular application depends on the wavelength responsivity of the detector which is matched with a light source capable of emitting such wavelengths.

The desired range of wavelengths to be analyzed dictates the type of detector used in the present invention, which typically is wavelength limited. For example, a fairly inexpensive silicon photodiode array is capable of detecting light intensities of wavelengths between 400 and 1100 nanometers. Other detectors optionally used in the invention are lead sulfide and lead selenide detectors, which support a response between 1000 to 3000 nanometers and 3000 to 5000 nanometers respectively. The detector will be discussed in more detail later in the application.

The light source 10 is positioned to shine upon the sample 14 to be analyzed. Preferably, the light source 10 is a quartz halogen or tungsten filament bulb and is widely available. Additionally, it is optionally stabilized by filtering or using an integral light sensitive feedback device in a manner which is known in the art (not shown).

The light source 10 and related components are preferably positioned within a suitable housing 11. In such an instance, a first window 12 is disposed between the light source 10 and the sample 14 to be analyzed. This prevents debris from entering the cavity and obstructing the illuminating light source 10. The first window 12 is formed of a suitable material, such as sapphire or glass, which is transmissive at the wavelengths of interest, and which does not see a significant absorption shift due to temperature changes. Sapphire also resists scratching and, therefore, debris brushing against its surface will not damage the window.

The housing 11, including the enclosed light source 10, first window 12, and other related components to be described, is thus positioned to monitor the sample 14 to be analyzed. This is accomplished by positioning the housing 11 such that light radiating from the light source 10 shines through the first window 12 onto the sample 14.

A parabolic mirror or reflector 17 is disposed within the light source cavity to direct light from the light source 10 to the sample 14 being analyzed. In the preferred embodiment, the light emanating from light source 10 is either collimated or focused to enhance the intensity of the light reflected off the sample. However, lens 20 optionally provides a means of additionally focusing or de-focusing the light into a more or less intense beam. In other words, the irradiated light shining on the sample 14 is optionally focused rather than collimated.

In an alternate embodiment, more than one light source 10 can be used, such as an array of infrared emitters. Typically, the array would be focused on the same point.

It is preferred that the light source 10 be placed such that it directly illuminates the sample 14 to be analyzed through the first window 12 with no fiber optic or other device other than the first window 12 itself being disposed between the light source 10 and the sample 14.

In the preferred embodiment, the illumination spot size from the light source 10 onto the sample 14 is approximately 1 to 3 inches in diameter, creating a spot of light between 0.5 and 10 square inches. Effectively, the incident light 48 shines through the first window 12 onto the sample 14 to produce reflected light 49 directed towards a second window 13 and analysis chamber where light intensities are analyzed.

In a colorimeter application detecting, for example, wall paper, the light source 10 is directed towards sample 14, creating a large illumination spot size preferably between 0.5 and 10 square inches. Reflected light from the sample is analyzed to determine particular color components.

A wide illumination spot size and corresponding viewing aperture is preferred because it results in more accurate measurements of the sample 14 to be analyzed.

This is due to the fact that small inconsistencies relative to the larger spot size within a sample region are typically negligible with respect to the whole. In other words, the wider spot size produces a better averaging effect because a potential inconsistency in a sample is not the only focus of the illumination spot.

Without a wide viewing aperture, calorimeter and constituent measurements based on small spot sizes can produce inaccurate results if the operator of such a device erroneously takes a sample measurement of an inconsistency in the sample not representative of the whole. For example, a small black spot on a dark blue background barely detectable by the naked eye could fool an operator that the color of the sample is black rather than blue. The present invention reduces erroneous calorimeter measurements by advantageously including a wider illumination spot size and viewing detector to support the aforementioned color averaging effect.

The device is optionally used, for example, by interior decorators to match complementary items. By analyzing the color components of a large sample region on a piece of wallpaper, an interior decorator is able to determine the optimal color matching of items such as curtains or paint that are to be displayed in the same room.

Spectral analyzers available in the market often incorporate costly optical hardware for receiving the light reflected off a sample 49 and directing it to an optical detector located at a distance. To view even a small spot with these systems requires a high intensity light source. This method of using optical hardware to redirect the reflected sample light 49 limits the spot size to a narrow diameter because the reflected light must be focused into a small fiber optic cable.

The present invention, on the other hand, advantageously positions a detector 52 with a wide viewing aperture located in a second chamber 65 immediately adjacent the first chamber 68 to receive the reflected sample light 49. This eliminates the need for costly fiber optic hardware because received light no longer needs to be directed to a detector at a remote location. Rather, reflected sample light 49 naturally strikes a detector 52 located immediately in the second chamber. To match the performance of the present invention, a fiber system would require a very large fiber bundle for redirecting reflected sample light to a remote detector.

Eliminating the fiber optic pickup and associated fiber optic cables has advantages in addition to enabling the use of a wider illumination spot size. Typically, fiber optic cables have a limited transmission bandwidth. Hence, when they are used to steer reflected light to a detector located far away, the spectral range of directed light is limited to the transmission bandwidth of the cable. Moreover, the use of fiber optic cables are further prohibitive because the fiber optic cables supporting the wavelengths of mid infrared are particularly expensive and have large throughput losses associated with them. In some cases, just a few meters of this type of cable can be more than a thousand dollars. The present invention is not as bandwidth limited nor burdened with unnecessary additional cost because it does not incorporate any fiber optic cables to transmit light.

The use of a fiber optic cable to transmit the reflected sample light 49 is additionally undesirable because the integrity of the optical signal within a fiber optic cable is susceptible to heat distortion and mechanical vibrations. This is especially true when the fiber optic cable supports the transmission of light in the infrared region. Both the heat distortion and mechanical vibrations, particularly prevalent in a portable device, negatively impact the integrity of the optical signal used to detect constituents in a sample. By placing the detector 52 in a second chamber 65 immediately adjacent the light source 10 without incorporating an optical fiber in the reflected sample light path 49, the present invention advantageously avoids the aforementioned problems.

The present invention, as described above, replaces the small fiber, which typically has an aperture area of less than 1 square millimeter, with a large viewing aperture of typically 0.5 to 10 square inches. This allows for viewing large fields of view with low light intensities. With additional optics, the aperture size can be adjusted to create a variable field of view and allows a large sample to be imaged from a distance.

As mentioned, light emitted by the light source 10 passes through the first window 12 onto the sample 14 to be analyzed. Incident light 48 from light source 10 then reflects off the sample 14, where the reflected sample light 49 is angularly directed back through second window 13.

In the preferred embodiment, the angle of the light source 10 and detector unit 52 in the second chamber 65 are optimized so that most of the reflected sample light 49 is directed to the second chamber 65 for spectral analysis of the sample 14. For example, the light source 10 may be optimally angled at approximately 60° relative to the first window 12 while the detector unit 52 in the second chamber 65 may be angled at approximately 60° relative to the second window as shown in illustrative FIG. 1.

The first and second window 12, 13 are preferably parallel and in the same plane as shown. However, other embodiments optionally include windows that are positioned at an angle with respect to each other, while the first and second chamber 65, 68 are still positioned adjacent to each other. Still other embodiments incorporate a first and second chamber opposing each other such that incident light from the first chamber is directed at a detector in the second chamber, wherein a sample disposed between a source and detector is analyzed based on its transmissive properties. For example, an optically transmissive tube containing a liquid to be analyzed is optionally placed in between an opposing light source and detector, supporting the analysis of a static or flowing liquid.

The second chamber 65, as mentioned, includes optical devices for detecting the reflected sample light 49. Specifically, the reflected sample light 49 passes through the second window 13 into the second chamber 65 where it is spectrally analyzed. Diffuser 59 acts to scatter the reflected sample light 49, spatially distributing the intensity of the light throughout the second chamber 65 for more accurate simultaneous spectral readings and to prevent imaging of the sample. For example, reflected sample light 49 of various wavelengths is more evenly distributed throughout the second chamber 65. Otherwise, high intensity light regions caused by reflected sample light 49 results in less accurate constituent measurements due to imaging effects.

Hermetically sealed chamber 46 is positioned in the second chamber 65 to receive reflected sample light 49. An optically transmissive third window 60 allows diffused light emanating from the diffuser to shine onto wavelength separator 50 and CCD array detector 52, both of which are positioned within the hermetically sealed chamber 46. This airtight chamber protects sensitive optical components from corrosive and measurement-inhibiting elements such as humidity and dust. Without the hermetically sealed chamber 46, a buildup of dust and other debris on the detection unit 52 and wavelength separator 50 will negatively effect constituent measurements. It should be noted that all, none or part of the second chamber 65 is optionally designed to be hermetically sealed.

The wavelength separator 50 within hermetically sealed chamber 46 in a preferred embodiment provides spatial separation of the various wavelengths of diffusely reflected light energy of interest. Suitable wavelength separators 50 include linearly variable filters (LVF), gratings, prisms, interferometers or similar devices. The wavelength separator 50 is preferably implemented as a linearly variable filter (LVF) having a resolution ($\Delta\lambda/\lambda$) of approximately one to four percent.

The now spatially separated wavelengths in turn are fed to the detector 52. The detector 52 is positioned such that it simultaneously measures the response at a broad range of wavelengths. In the preferred embodiment, the detector 52 is an array of charge coupled devices (CCDs), which individually measure the light intensity at each of the respective wavelengths. In other words, each cell of the CCD array is tuned to measure the intensity of an individual bandpass of light.

Other suitable detectors 52, however, are constructed from fast scan photodiodes, charge injection devices (CIDs), or any other arrays of detectors suitable for the task of simultaneously detecting the wavelengths of interest.

In a preferred embodiment, the detector 52 is a silicon CCD array, such as a Fairchild CCD 133A available from Loral-Fairchild. This CCD array 52 is a 1,024 element array processing wavelengths in the range from about 570 to about 1120 nm. As mentioned, other detectors supporting different bandwidths are optionally used.

In addition, the detector 52 such as a CCD array is typically temperature sensitive so that stabilization is usually preferred. Cooling is achieved using a thermoelectric cooler.

The preferred embodiment of the present invention also includes a reflector 22 disposed in the first chamber to reflect reference photons 23 to the wavelength separator 50 and detector 52 positioned in the second chamber 65 depending on the position of light blocking shutters. The reflector 22 is preferably fixed such that repeated measurements are based upon the same reference light intensity.

At any given time, the shutter 19 is controlled to allow the appropriate light to flow into the second chamber 65. Shutter 19 controls the passage of either sample light 49 into the second chamber 65, or the passage of reference light 23 reflected off reference light reflector 22 into the second chamber 65. A second shutter (not shown) is used to block all incoming light for measuring a "dark" reference signal.

Control electronics 18 and shutter motor 21 located adjacent to the second chamber 65 provide a mechanism for controlling light into second chamber 65. Shutter position commands are received via electronic signals transmitted by controller 35 residing in the electronics block 30.

Figure 2:
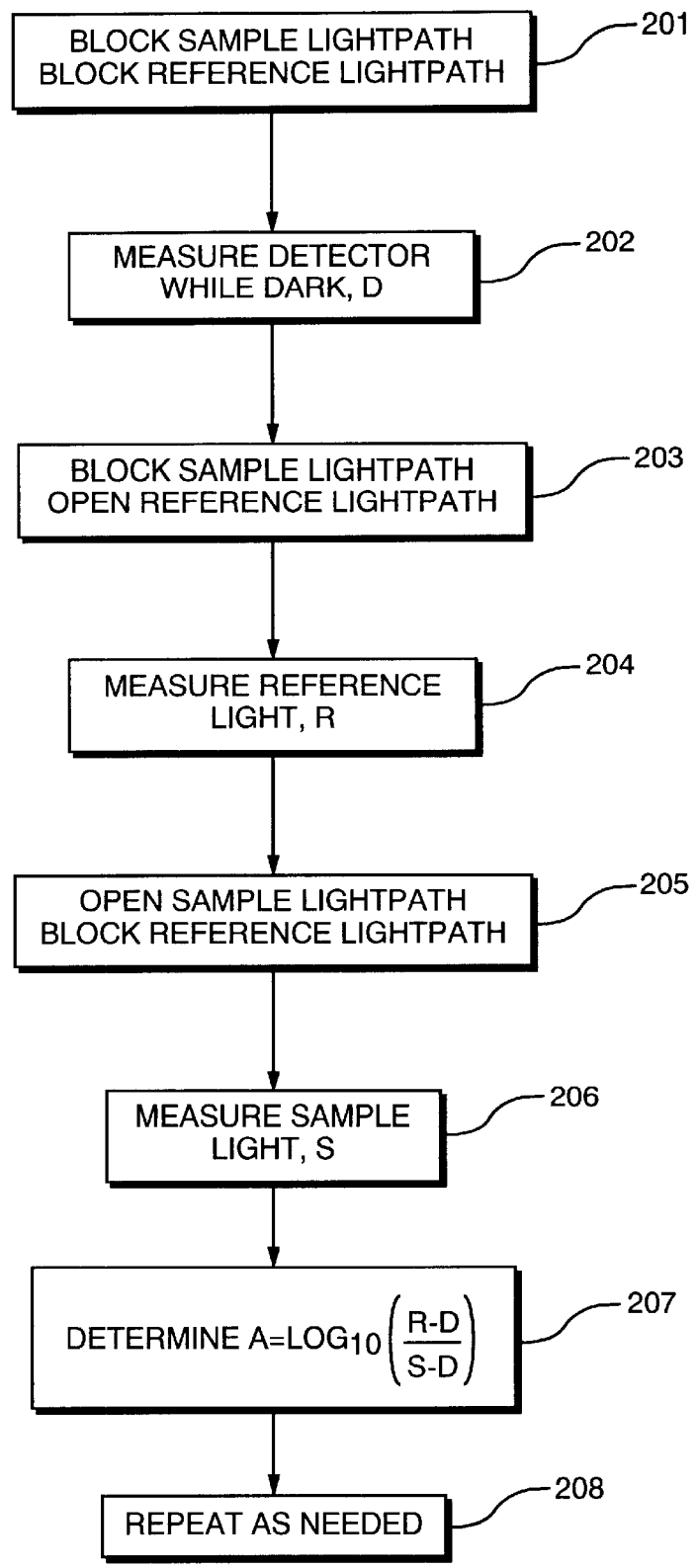
FIG. 2 is a flow chart depicting a process for measuring absorptivity of a sample according to the principles of the present invention.

Light blocking shutters are appropriately positioned for each of three measurements. A first measurement involves blocking both the reflected sample light 49 and reference photons 23. This reference measurement of the "dark" second chamber 65 serves as a means of calibrating the detector unit or array 52. A second measurement involves blocking the reflected sample light 49 and measuring the reference photons 23. This measurement serves to calibrate the system to the light source 10. Finally, a third measurement involves blocking the reference rays 23 and measuring the reflected sample photons 49. Details of the measurements and related computations are further described in FIG. 2.

An electronic signal or signals 27 between the electronics block 30 and system housing 11 provide a way for the controller 35 to pass signals controlling the position of the first and second shutter, and specifically the flow of reference photons 23 and reflected sample light 49 into the second chamber 65 where the detector unit 52 resides. For example, the first shutter is placed in the open position to allow light to pass to the sample and to be diffusely reflected by the sample 14 during measurement operations, and placed in a closed position to occlude light from the sample and diffusely reflected light from the shutter during reference measurements. The second shutter is used to block the reference photons 23 from entering the second chamber 65 during detector unit 50 calibration and sampling.

The electronic signals 27 are bundled together in a wire harness 28 connecting the system housing 11 and electronics block 30. In a practical deployment of the system 100, it is preferred that the electronics block 30 be as close as possible to housing 100. However, in some applications it may be necessary to separate housing 100 and electronics block 30.

The electronics block 30 includes an analog to digital converter 33, a constituent computation function 34, a controller 35, and a display interface 36. In the preferred embodiment, the computation function 34, controller 35 and display interface 36 are implemented as software in a computer, microcontroller, microprocessor and/or digital signal processor. Electronic signals 27 in wire harness 28 provide connectivity between the electronics in the system housing 11 and the electronics block 30.

As mentioned, one application of the present invention involves mounting the electronics block in a shielded environment, such as a cab, while the housing 11 of the optical system 100 is mounted in a position to detect the sample 14 to be analyzed. Therefore, based on this separation, the electronics are designed to ensure that signal integrity does not suffer because of the length of the wire harness 28. For example, the electronic signals 27 within wire harness 28 are properly shielded to prevent excess coupling noise, which may deleteriously effect A/D readings of the CCD array detector 52. The controller 35 coordinating the A/D sampling process, as mentioned, controls the shutter mechanisms positioned in the second chamber 65 for the various spectral measurements.

The individual electrical signals provided by the CCD for each wavelength are then fed from the output of the detector 52 to analog to digital converter 33 where the electrical signals are converted to digital signals for processing.

A computation block 34, preferably implemented in a microcomputer or digital signal processor as described above, then carries out calculations on the basis of the received wavelength intensities to obtain either the color characteristics or percentage concentrations of constituents of the sample 14. The results of the sample analysis are then communicated to an operator in any desired way such as by a meter or presenting them to a display. The display is optionally integral to a laptop computer or display, such as an LCD, on or near the electronics block 30 or system 100. The computation block may be part of the electronics block 30 or may be physically separated from it.

In the preferred embodiment, the electronics block 30 and system 100 are integrated to produce a handheld portable spectral analyzer. This embodiment is particularly beneficial in calorimeter applications that require analyzing the sample in a fixed location such as a home where wallpaper is already fixed to a wall. Based on its portability, the analyzer is easily maneuvered to test samples in awkwardly tight spaces. Additionally, because of its small size, it is less likely to be damaged or dropped during transit or use.

The analyzer of the present invention also supports calculating constituent concentrations in samples such as grain. Techniques for calculating percentage concentrations of grain based upon samples of light and particular wavelengths are the multi-variate techniques detailed in the book by Sharaf, M. A., Illman, D. L., and Kowalski, B. R., entitled "Chemometrics" (New York: J. Wiley & Sons, 1986).

Preferred wavelengths of interest depend upon the constituents being measured. For example, when measuring protein concentration, the algorithms makes use of absorptance attributable to the vibration-rotational overtone bands of the sub-structure of protein. At longer wavelengths absorptivity coefficients are large, the path length is short, and thus one would not sample the interior of the grain particles. At shorter wavelengths the absorptivity coefficients are small and the signal is thus weak.

The system 100 provides for irradiation of the sample followed by spatial separation and detection of multiple wavelengths in parallel, making for rapid analysis of this sample. Moreover, because the optical portions of the unit are stabile to vibrations, it is substantially insensitive to vibrations. The system 100 may therefore be easily deployed in environments where real time analysis of samples is performed in harsh environments.

Furthermore, the use of the CCD array as detector unit 52 provides advantages over prior art techniques that use discrete or scanned diode arrays. In particular, the CCD bins are all filled with charge at the same time in parallel with one another. They are then emptied and the results read out by the controller 35 are processed while the CCD array begins filling again. Based on sampling over a time period, each pixel or bin detects reflected light intensities off the sample over the same time interval. This is particularly important if the sample happens to be moving across the viewing region of the device. In contrast, diode arrays must be read sequentially so that for example, any given element is producing a signal from the sample if it is distinct from those seen by previous pixels.

The signal to noise ratio of the system 100 may be improved by averaging over the course of many measurements.

The preferred absorptivity measurement includes the following process (also depicted in FIG. 2):

1. Block both the sample reflection light and reference light from the wavelength detector unit (step 201)
2. Perform a reading on the wavelength detector unit, storing measurement data in D for dark spectrum (step 202).
3. Block the sample reflection light and allow reference light to shine on wavelength detector unit (step 203).
4. Perform a reading on the wavelength detector unit, storing measurement data in R for reference light spectrum (step 204).
5. Block the reference light and allow sample reflection light to shine on wavelength detector unit (step 205).
6. Perform a reading on the wavelength detector unit, storing measurement data in S for sample spectrum (step 206).
7. Calculate the absorptance spectrum A, where the light absorption as derived from these diffuse reflectance measurements is given by:

$$A = LOG_{10}(R-D/S-D).$$

In addition, since the absorptivity variations from the presence of protein are quite small, multiple realizations, averaging, and second derivative analysis are typically used to produce the desired absorptivity number at a particular wavelength. Further data processing therefore may provide a second derivative of this function to remove constant and linear offsets so that only quadratic and higher order features in the absorptivity spectrum are utilized in the determination of protein content.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An apparatus for analyzing a sample based on spectroscopy, the apparatus comprising:
    a light source disposed in a first chamber arranged to irradiate a sample with a large illumination spot size, the light source emitting a plurality of wavelengths within a selected irradiation bandwidth;
    a wavelength separator disposed in a second chamber, the wavelength separator receiving light reflected from the irradiated sample to produce spatially separated light of different wavelengths;
    a detector with a wide viewing aperture, also disposed in the second chamber, positioned to receive light from the wavelength separator for detecting light intensities at multiple selected wavelengths; and
    a reflector positioned in the first chamber to reflect a portion of light emanating from the light source into the second chamber for calibration measurements.

2. An apparatus as in claim 1 wherein the light source irradiates light through a first window in the first chamber onto a sample to be analyzed.

3. An apparatus as in claim 2 wherein the wavelength separator receives light through a second window in the second chamber from the irradiated sample.

4. An apparatus as in claim 1 wherein components of the apparatus are integrated to provide a portable handheld device.

5. An apparatus as in claim 1 further comprising:
    a shutter mechanism that selectively blocks light reflected off the reflector and irradiated sample that would otherwise shine towards the detector.

6. An apparatus as in claim 1 wherein the selected irradiation bandwidth is within a visible to mid infrared spectral region.

7. An apparatus as in claim 1 further comprising:
    a diffuser for diffusing light reflected from the irradiated sample into the wavelength separator.

8. An apparatus as in claim 1 wherein constituent components of the sample are determined based on intensities of detected wavelengths.

9. An apparatus as in claim 1 wherein color components of the sample are determined based on intensities of detected wavelengths.

10. An apparatus as in claim 9, wherein the detector has a wide viewing aperture to support color averaging of the sample to be analyzed.

11. An apparatus as in claim 1 wherein the light source illuminates a spot size in a range between about 0.5 and 10 square inches and the detector has a viewing aperture in a range between about 0.5 and 10 square inches.

12. An apparatus as in claim 1 wherein the first and second chamber prevent stray light from shining on the detector.

13. An apparatus for analyzing a sample based on spectroscopy, the apparatus comprising:
   a light source arranged to irradiate a sample with a large illumination spot size, the light source emitting a plurality of wavelengths within a selected irradiation bandwidth;
   a diffuser that evenly distributes intensities of light irradiated from the sample;
   a wavelength separator that receives light from the diffuser to produce spatially separated light of different wavelengths;
   a detector with a wide viewing aperture positioned to receive light from the wavelength separator for detecting light intensities at multiple selected wavelengths; and
   a reflector positioned to reflect a portion of light emanating from the light source into the wavelength separator for calibration measurements.

14. An apparatus as in claim 13 wherein the light source irradiates light through a first window onto the sample to be analyzed.

15. An apparatus as in claim 14, wherein the wavelength separator receives light from the irradiated sample through a second window.

16. An apparatus as in claim 14 wherein components of the apparatus are integrated to provide a portable handheld device.

17. An apparatus as in claim 13 further comprising:
   a shutter mechanism that selectively blocks light reflected off the reflector and irradiated sample portion that would otherwise shine towards the detector.

18. An apparatus as in claim 13 wherein the selected irradiation bandwidth is within a visible to mid infrared spectral region.

19. An apparatus as in claim 13 further comprising:
   an analog to digital converter, connected to receive the detected intensity signals and to provide detected intensity values.

20. An apparatus as in claim 19 further comprising:
   a computer, connected to receive the detected intensity signals from the detector, and to analyze the sample based on the detected intensity values.

21. An apparatus as in claim 13 wherein constituent components of the sample are determined based on intensities of detected wavelengths.

22. An apparatus as in claim 13 wherein color components of the sample are determined based on intensities of detected wavelengths.

23. An apparatus as in claim 13 wherein the detector has a wide viewing aperture to support color averaging of the sample.

24. An apparatus as in claim 13 wherein the light source illuminates a spot size in a range between about 0.5 and 10 square inches and the detector has a viewing aperture in a range between about 0.5 and 10 square inches.

25. A method for spectrally analyzing a sample, the method comprising the steps of:
   irradiating a sample with a large illumination spot size from a light source positioned in a first chamber, the light source emitting a plurality of wavelengths within a selected irradiation bandwidth;
   receiving a wide angle viewing aperture of light reflected from the irradiated sample into a second chamber;
   separating wavelengths of the received light to produce spatially separated light of different wavelengths;
   detecting multiple selected wavelengths of light intensities of the spatially separated light with a detector; and
   reflecting with a reflector a portion of light emanating from the light source into the second chamber for calibration measurements.

26. A method as in claim 25 wherein the light source irradiates light through a first window in the first chamber onto a sample.

27. A method as in claim 26 wherein the wavelength separator receives light from the irradiated sample through a second window in the second chamber.

28. A method as in claim 25 further comprising the step of:
   selectively enabling light to enter into the second chamber from the reflector and irradiated sample.

29. A method as in claim 25 wherein the selected irradiation bandwidth is within a visible to mid infrared spectral region.

30. A method as in claim 25 further comprising the step of:
   diffusing light reflected from the irradiated sample into the wavelength separator.

31. A method as in claim 25 wherein constituent components of the sample are determined based on intensities of detected wavelengths.

32. A method as in claim 25 wherein color components of the sample are determined based on intensities of detected wavelengths.

33. A method as in claim 32 wherein detecting a wide viewing aperture to support color averaging of the sample.

34. A method as in claim 25 wherein a wide angle viewing aperture of received light is between about 0.5 and 10 square inches.

35. A method as in claim 25 wherein a large illumination spot size is between about 0.5 and 10 square inches.

36. A method as in claim 25 wherein the first and second chamber prevent stray light from shining on the detector.

37. A method for spectrally analyzing a sample, the method comprising the steps of:
   irradiating a sample with a large illumination spot size from a light source positioned in a first chamber, the light source emitting a plurality of wavelengths within a selected irradiation bandwidth;
   receiving light reflected from the irradiated sample using a wide angle viewing aperture;
   distributing wavelengths of light irradiated from the sample with a diffuser;
   separating wavelengths of the received light to produce spatially separated light of different wavelengths;
   detecting multiple selected wavelengths of light intensities of the spatially separated light with a detector; and
   reflecting with a reflector a portion of light emanating from the light source towards the detector for calibration measurements.

38. A method as in claim 37 wherein the light source irradiates light through a first window onto a sample.

39. A method as in claim 38 wherein the wavelength separator receives light through a second window from the irradiated sample.

40. A method as in claim 37 further comprising the step of:

selectively enabling light from the reflector and irradiated sample portion to shine upon a detector for detecting light intensities of the spatially: separated light at multiple wavelengths.

41. A method as in claim 37 wherein the selected irradiation bandwidth is within a visible to mid infrared spectral region.

42. A method as in claim 37 further comprising the step of:

determining light intensities of the spatially separated light at multiple selected wavelengths using one or more A/D converters.

43. A method as in claim 42 further comprising the step of:

providing a software program that runs on a computer to analyze a sample based on the light intensities of the selected wavelengths.

44. A method as in claim 37 wherein constituent components of the sample are determined based on intensities of detected wavelengths.

45. A method as in claim 37 wherein color components of the sample are determined based on intensities of detected wavelengths.

46. A method as in claim 37 wherein the detector has a wide viewing aperture to support color averaging of the sample.

47. A method as in claim 37 wherein a wide angle viewing aperture of received light is in a range between about 0.5 and 10 square inches.

* * * * *